United States Patent [19]

Kay et al.

[11] Patent Number: 4,618,667
[45] Date of Patent: Oct. 21, 1986

[54] NUCLEATION OF URETHANE COMPOSITIONS

[75] Inventors: Edward L. Kay, Akron; Kenneth B. Roskos, Clinton, both of Ohio

[73] Assignee: The Firestone Tire & Rubber Company, Akron, Ohio

[21] Appl. No.: 724,692

[22] Filed: Apr. 18, 1985

[51] Int. Cl.[4] .................... C08G 18/32; C08G 18/34; C08G 18/30
[52] U.S. Cl. ........................ 528/49; 528/44; 528/59; 528/906; 528/63
[58] Field of Search ............ 528/44, 59, 49, 63, 528/906

[56] References Cited

U.S. PATENT DOCUMENTS

| 3,087,900 | 4/1963 | Brown | 260/2.5 |
|---|---|---|---|
| 3,124,543 | 3/1964 | Fowler et al. | 260/2.5 |
| 3,179,625 | 4/1965 | Ehrhart | 260/75 |
| 3,471,445 | 10/1969 | Carr | 528/63 |
| 3,660,326 | 5/1972 | Mallabar | 260/18 TN |
| 3,781,235 | 12/1973 | Trott et al. | 260/2.5 |
| 3,919,174 | 11/1975 | Taller | 528/44 |
| 4,089,835 | 5/1978 | Koenig et al. | 260/31.6 |
| 4,499,254 | 2/1985 | Dominguez et al. | 528/49 |
| 4,513,133 | 4/1985 | Dominguez et al. | 528/49 |

Primary Examiner—Herbert S. Cockeram
Attorney, Agent, or Firm—Daniel N. Hall

[57] ABSTRACT

Urethane compositions generally free of phase separation patterns and flow lines are produced. One method includes the utilization of a nucleating compound which is generally added to a urethane prepolymer before any chain extension thereof. Examples of nucleating agents include urethanes, ureas and allophanates such as carboxylic acids, organic acid and anhydrides, amides, imides and the like. Another method includes adding a very small initial incremental amount of a curing agent to the prepolymer with an insoluble product being produced thereby and subsequently adding the remainder of the curing agent.

23 Claims, No Drawings

NUCLEATION OF URETHANE COMPOSITIONS

TECHNICAL FIELD

The present invention relates to the addition of organic polar compounds or nucleating agents to urethane prepolymers to effect a more uniform phase separation of the hard segments during the cure of the urethane prepolymers in order to eliminate phase separation patterns.

BACKGROUND

Heretofore, during the cure of urethane prepolymers, phase separation patterns would occur. These phase separation patterns appear as relatively opaque white spots on a translucent white background of the cured urethane test plaque. The presence of these opaque white spots is visual evidence that the cured urethane is not homogeneous or of uniform quality throughout the plaque. When centrifugally casting large urethane parts, these opaque white spots are distorted and appear as flow lines in the cured urethane; that is, opaque white, broad lines on a background of translucent white. These opaque broad lines have no gross voids and are therefore not attributable to occluded gases.

SUMMARY OF THE INVENTION

Accordingly, it is an aspect of the present invention to provide a cured urethane composition essentially free of phase separation patterns.

This and other aspects of the present invention will be better understood by reference to the following detailed specification.

In general, a urethane elastomer composition comprises: a urethane prepolymer having free polyisocyanate therein; and from about 0.01% to about 5.0% by weight based upon the weight of said prepolymer of a dispersed nucleating agent.

PREFERRED EMBODIMENTS

Cured urethane compositions are produced free from or essentially free from phase separation patterns as, for example, flow lines.

As known to the art, urethanes are generally made from intermediate or low molecular weight polymers containing hydroxyl or amine end groups. Such intermediates are generally characterized by two or more hydroxyl and/or amine groups which react with the isocyanate functions of a polyisocyanate. Generally, the hydroxyl and/or amine functions are limited to two per molecule as well as two isocyanates per molecule to obtain a linear (non-crosslinked) polyurethane when cured with a difunctional curing agent. If a crosslinked polyurethane is desirable, a trifunctional agent can be utilized such as a triol, triamine, or a trifunctional extender.

According to the present invention, generally any intermediate can be utilized. That is, intermediates which are a polyester, a polyether, or a mixed polyester-polyamide. Examples of suitable intermediates include poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives thereof.

The intermediate is then reacted with a polyisocyanate to form the prepolymer. Suitable polyisocyanates include those having the formula $R-(N=C=O)_n$, where R can be an aliphatic containing from about 2 to about 20 carbon atoms, a cycloaliphatic containing from 4 to about 20 carbon atoms, and aromatic containing from 6 to about 20 carbon atoms, or combinations thereof as for example, alkyl-substituted aromatics. Desirably R is an aromatic or an alkyl substituted aromatic having from 6 to 14 carbon atoms. The number of isocyanate units, that is "n" is an integer such as 2, 3 or higher with 2 being highly preferred. Examples of polyisocyanates include the following as well as isomers thereof; diphenyl diisocyanates; 2,4,4'-triisocyanate diphenyl ether; triphenylmethane triisocyanate; benzene-1,2,4-triisocyanate; naphthalene-1,3,7-triisocyanate and the like. Highly preferred polyisocyanates include meta or para-phenylene diisocyanate; diphenylmethane diisocyanates; bitolylene diisocyanates; dianisidine diisocyanates; isophorone diisocyanates; toluene diisocyanates; hexamethylene diisocyanate; pentamethylene diisocyanate; and MDI, that is 4,4'-diphenylmethane diisocyanate.

Desirably, an excess amount of the polyisocyanate is utilized resulting in the existence of free polyisocyanates. The amount of such free polyisocyanates is generally expressed as "free isocyanate" [NCO] as a weight percent of the prepolymer and ranges from about 1.0% to about 20%. More typically, from about 4% to about 16%, and preferably from about 8% to about 13% free NCO which groups are not reacted.

The general procedure for the preparation of the prepolymers can be according to any common or conventional method. One such procedure relates to the addition of molten polyisocyanate at approximately 40° C. to the intermediate or a blend of such intermediates. The blend is then heated under vacuum (less than 5 torr) for a short period of time such as about 30 minutes at 100° to about 110° C. The prepolymer is then cooled and stored under an anhydrous nitrogen atmosphere at 40° C. An alternative method is to add the polyisocyanate to the basic intermediate or a blend of basic intermediates at approximately 70° C. and heat the reaction mixture for a sufficient amount of time, for example about two hours at 70° to complete the reaction. This prepolymer can also be stored under anhydrous nitrogen at 40° C.

When the above urethane prepolymers are cured, they have polar segments generally referred to as hard segments which are located at the urethane group, and which are insoluble and therefore, on a large scale, can precipitate out. A uniform precipitation or separation of these hard segments is desirable in order to obtain a homogeneous or completely uniform cured urethane. It has been determined that polyurethane compositions based on only prepolymer and extender tend to phase separate during chain extension (precipitation of the more polar segments). Such precipitation is generally visible as opaque areas or as flow lines relating to phase separation. In order to alleviate this problem, nucleating agents are utilized. The amount of such compounds is generally from about 0.01% to about 5.0%, desirably from about 0.5% to about 3%, and preferably from about 1% to about 2% by weight based upon the weight of the prepolymer.

Generally any polar organic compound that is insoluble in the urethane prepolymer and has a melting point above the temperature at which the prepolymer is cured so that the polar organic compound will be solid and function as a nucleating site for the hard segments during cure can be utilized. The melting point of the nucleating agent is at least 5° C. and preferably at least 10° C. higher than the curing temperature is desirably is a solid at room temperature. As a matter of convenience, the nucleating agent is usually added to the urethane prepolymer in the presence of a solvent. In general, the polar organic compounds which will alleviate nonuniform phase separation are compounds which have chemical structures similar to the hard segments of the cured urethane. Thus, urethanes, ureas and allophanates of suitable melting points and solubility can be utilized. Organic compounds having slightly different structures relative to urethanes, ureas and allophanates such as carboxylic acids, organic acid anhydrides, amides, imides and the like can also be utilized providing the melting point and solubility constraints are met.

Dicarboxylic acids having from 2 to about 12 carbon atoms with from about 4 to about 8 carbon atoms are preferred. Aromatic acids include phthalic acid, terephthalic acid, and the like. Examples of aliphatic dicarboxylic acids include oxalic acid, malonic acid, succinic acid, adipic acid, maleic acid, and the like. Typically, unsaturated acids are desired. The acid anhydrides contain from 4 to about 12 carbon atoms with from about 4 to about 8 carbon atoms being preferred. Examples of various acid anhydrides include succinic anhydride, phthalic anhydride, and the like. The amides generally have from 2 to 8 carbon atoms with 2 to 4 carbon atoms being desirable. Specific examples include oxamide, malonamide, succinamide, benzamide, phthalamides and the like. The imides include those having from 4 to 12 carbon atoms and preferably from 4 to 8 carbon atoms. Examples include succinimide, phthalimide, and the like. Generally, the various carboxylic acids, acid anhydrides, imides, or amides can be aliphatic, aromatic, or mixtures thereof. Additionally, the urea compounds can contain various alkyl or aromatic groups thereon containing from about 1 to about 14 carbon atoms with specific examples being 1,3-dimethyl urea and carbanilide. Alternatively, the urea can have a multiple of functionality such as biuret(allophanamide). Examples of preferred nucleating agents include adipic acid, biuret, carbanilide, oxamide, and terephthalic acid.

Solvents for the nucleating agents include solvents nonreactive with isocyanate functions of the prepolymer or the free diisocyanate. The function of the solvent is to dissolve the polar organic compound to be added so that when the solution is added to the urethane prepolymer and the solvent removed by distillation, the polar organic compound separates as a fine solid; that is, the resulting mixture is a fine suspension of the polar organic compound in the urethane prepolymer. The polar organic compound need not be completely soluble in the solvent; that is, the "solvent" functions as a medium to disperse the polar organic compound in the urethane prepolymer. In addition, if the polar organic compound is of very small particle size, no solvent will be required. The fine particle size polar organic material could be added directly to the urethane prepolymer.

Suitable solvents include various ethers, esters and the like. Specifically dimethyl, diethyl, dipropyl ethers. Cyclic ethers such as tetrahydrofuran can be used. As stated previously, a function of the "solvent" is to aid in dispersing the polar organic compound in the urethane prepolymer. Thus hydrocarbons which can serve as a medium for finegrinding of the polar organic compound can be used to advantage. For example, propane, butanes, pentanes, hexanes and the like.

Accordingly, the nucleating agents are added to the prepolymer or the blends of the prepolymers and mixed therewith to achieve a fine uniform dispersion. Inasmuch as a uniform fine dispersion is desired, the particle size of the high melting temperature compound is usually small, for example 200 microns or less, 100 microns or less and desirably 10 microns or less. Any suitable type of mixing apparatus can be utilized so long as a fairly uniform distribution is produced. The solvent can then be removed through conventional methods as by stripping off, for example by applying a vacuum, increasing the temperature, combinations thereof, or the like to remove the solvent therefrom.

When various chain extenders, that is curing agents (set forth below), are added to the prepolymer-high melting temperature compound blend, a cured product is produced generally free from phase separation patterns or flow lines. In other words, a uniform translucent product is obtained. While not being limited thereto, it is thought that the finely dispersed high-melting organic compounds function as nucleation sites to effect a more uniform phase separation of the hard segments.

The prepolymer nucleating agent dispersion in the urethane prepolymers can either be stored or utilized shortly thereafter. In either event, it is generally cured (chain extended) with glycols, diamines, or amino alcohols. Suitable types of such chain extenders are well known to the art are usually polar. Examples of suitable polyol chain extenders include aliphatic, aromatic or alkyl substituted aromatic groups such as ethylene glycol, 1,3-propanediol, 2-methyl-1,3-propanediol, 1,4-butanediol and the like. Amine analogs of such polyols can also be utilized as well as mixed amine/ols such as ethanol amine, 3-aminopropanol, and the like. Moreover, various aromatic amines such as ortho, meta, or para-phenylenediamine and the like can be utilized. Additionally, the various aminophenols can be utilized. Generally, desirably curing or chain extending agents include low molecular weight polyols or amines having from 2 to about 12 carbon atoms and preferably from about 4 to about 8 carbon atoms. Typically, alkyl, aromatic, or alkyl substituted aromatic compounds can be used to advantage.

Generally, the chain extension temperature (the temperature of the prepolymer at which the chain extender is added) can be varied over wide limits such as between 25° C. and 200° C.; preferably 30° C. and 140° C. and more preferably at 40° C. to 100° C. The cure temperature, that is the temperature of the mold into which the chain-extended prepolymer is transferred for final curing may also be varied over wide limits but usually is from 110° C. to 200° C.; preferably 130° C. to 180° C. and more preferably 140° C. to 160° C. Chain extension is generally carried out in a common or conventional manner. The amount of curing agent is such that the equivalent OH/NCO or other end group ratio is from about 0.80 to about 1.20, desirably from about 0.95 to about 1.05 and preferably about 1.00.

Another method of producing cured urethanes essentially free of phase separation patterns relates to the incremental addition of a very small amount of curing agent (chain extending agent) to the urethane prepolymer with the remaining amount of the curing agent being subsequently added. It is also important that an insoluble product be produced via the incremental addition which product contains polyisocyanate-curing agent adducts. Accordingly, this aspect of the present invention relates only to urethane prepolymer-curing agent systems which produce such insoluble products upon the incremental addition of the curing agent. By the term "insoluble" it is meant that a visible precipitate forms. Naturally, the insolubility of the adduct tends to vary with the prepolymer, type of curing agent, and the like. Generally, the incremental addition can be added to the prepolymer formulation prior to, during or subsequent to the prepolymer formulation reaction.

According to the very small incremental addition method, the various components are generally the same as set forth above. That is, the intermediates and the various polyisocyanates, and the amounts thereof are as set forth hereinabove.

The incremental method relates to utilizing a very small amount of chain extender, such as from about 0.01 to about 5.0 percent and preferably from about 0.5 to about 3.0 or 4.0 percent by weight of the total weight of said curing agent being added to produce the cured polyurethane elastomer. Suitable chain extenders with regard to this incremental addition are generally the same as set forth above and thus include various polyols such as ethylene glycol, 1,3-propanediol, 2-methyl-1,3-propanediol, 1,4-butanediol and the like. Additionally, amine analogs of the listed polyols can also be utilized as well as mixed amine/ols such as ethanol amine, 3-aminopropanol and the like. Trifunctional extenders can also be used.

When utilizing the incremental step, generally only one initial incremental addition is made and the subsequent addition includes all of the remaining curing agent. The reaction of the incremental curing agent is generally carried out in the presence of an anhydrous inert gas such as nitrogen. The incremental addition is also generally carried out at a high temperature to ensure rapid and complete reaction of the incremental curing agent with the free polyisocyanate to form the desired adducts. Accordingly, a temperature range of from about 25° C. to about 110° C. is generally utilized and preferably a temperature of from about 40° C. to about 70° C. The lower temperatures ensure the more complete separation of the diisocyanate chain extender adducts.

Surprisingly, such very small amounts of an incremental addition have been found to abate or eliminate phase separation patterns. While the reason is not clearly understood, it is thought that the precipitated adducts form nucleation sites.

The invention will be better understood by reference to the following examples.

Identification of Polyols and Reagents

Voranol 5148, a product of Dow Chemical identified as a poly(oxypropylene)triol having approximately 20% poly(oxyethylene)glycol endblock; 7000 nominal molecular weight.

Carbowax 400, a product of Union Carbide identified as a poly(oxyethylene)glycol; 400 nominal molecular weight.

Carbowax 1000, a product of Union Carbide identified as a poly(oxyethylene)glycol; 1000 nominal molecular weight.

| Identification of 4,4'-Diphenylmethane Diisocyanate Prepolymers | |
|---|---|
| Code Letter | Composition |
| A | Voranol 5148/Carbowax 400; 90/10 by weight; 9.0 wt. % free NCO |
| B | Same as "A"; 10.0 wt. % free NCO |
| C | Same as "A"; 11.0 wt. % free NCO |
| D | Same as "A"; 12.0 wt. % free NCO |
| E | Voranol 5148/Carbowax 1000; 90/10 by weight; 10.0 wt. % free NCO |
| F | Same as "E"; 11.0 wt. % free NCO |
| G | Same as "E"; 12.0 wt. % free NCO |

MDI; 4,4'-diphenylmethane diisocyanate, a product of UpJohn Chemical.

BDO; butanediol-1,4; a product of DuPont Chemical.

The following chemicals were products of Aldrich Chemical: 1,3-dimethyl urea, urea, adipic acid, biuret, carbanilide, oxamide, terephthalic acid.

General Experimental Procedures

1. Prepolymer Formation: The general procedure for the preparation of prepolymers was to add molten MDI (ca.40° C.) to the intermediate or blend of intermediates. The MDI/polyol was heated under vacuum (5 torr) for 30 minutes at 100°–110° C., cooled and stored under an anhydrous nitrogen atmosphere at 40° C.

An alternative method was to add the MDI to the polyol or blend of polyols at 70° C. and heating the reaction mixture for two hours at 70° C. under vacuum. The prepolymer was stored under $N_2$ at 40° C.

The amount of MDI added to the polyol was calculated as follows:

(1) Based on the hydroxyl number of the polyol, the number of moles of hydroxyl function was calculated.

(2) The moles of hydroxyl function were converted to weight of MDI in a ratio of [OH]/MDI.

(3) The weight of MDI required to attain a desired level of "free NCO" (the amount of NCO function that theoretically would not have reacted during the prepolymer formation) was calculated.

(4) The weight of MDI calculated in item (2) and (3) was the total amount of MDI used in the prepolymer formation reaction.

Prepolymers prepared by the General Experimental Procedure were usually clear colorless liquids. Viscosities of the prepolymer depended upon the level of "free NCO" used.

2. Nucleating Agents: The general procedure for mixing nucleating agents with the various prepolymers as set forth in Table I is as follows. The appropriate prepolymer was added to a vessel having an inert anhydrous nitrogen atmosphere. To the vessel was added the amount indicated in Table I of the particular nucleating agent. The nucleating agents were dissolved in or suspended in tetrahydrofuran. After mixing, the tetrahydrofuran was removed (distilled under vacuum) to form a fine suspension of the nucleating agent in the prepolymers. These prepolymers were then chain extended and cured as described under item "4" following.

3. Incremental Addition of Extender: The general procedure for effecting an incremental addition of the extender was to calculate the total weight of BDO required to react with the prepolymer so that the stoichiometry would be in a ratio of OH/NCO=1.00.

The desired level of extender increment was then calculated as a percent of the total amount of BDO required for a OH/NCO=1.00. This amount of extender increment was then added to the prepolymer usually at 70° C.

Depending upon the amount of extender increment, the reaction mixture was either stored under nitrogen at 40° C. until the MDI/BDO adducts precipitated as a white solid or the reaction mixture was cooled to the desired chain extension temperature and chain-extended. Specifically, extender increments of about 0.1% to 3.0% or 4.0% required a finite time to effect precipitation of the MDI/BDO adducts and thus were stored until the adducts precipitated.

The amount of chain-extender used was corrected for the amount of extender added as an increment so that the final ratio of OH/NCO in the polyurethane was theoretically 1.00.

The prepolymers after the addition of the extender increment were usually opaque white fluids (dispersion of the adducts in prepolymer). Depending upon the amount of extender increment, the fluids varied in viscosities; the larger the extender increment, the higher the viscosity. The increased viscosities have an indirect beneficial effect in that during the centrifugal casting, the higher viscosity charge will flow more uniformly and minimizes splashing which leads to skin formation on the cast article.

4. Chain Extension/Cure Conditions: The chain-extension reaction was effected by adding the required amount of BDO to the prepolymer/adduct dispersion at between 35° C. and 55° C.; generally 40° C.

After complete mixing of the chain-extender/prepolymer/adduct, the reaction mixture was transferred into a 6"×6"×0.075" mold and cured at 140° C. (unless otherwise specified) for 30 minutes in a Wabash hydraulic press at 10 to 15 tons gauge pressure.

phase separation. These patterns appear as relatively dense opaque spots on a translucent white background. The pattern suggests the non-uniform separation of hard segments which can be visually observed on a hot mold after chain-extension and prior to placement of the mold top and placement of the mold in a heated hydraulic press for curing.

Examples (E, F, G) formulated with the 1000 molecular weight poly(oxyethylene)diol had a less pronounced opaque white phase separation pattern on a less translucent white background relative to Examples A, B, C and D.

The presence of the phase separation pattern was believed to be visual evidence of non-homogeneity of the cured polyurethane on a "gross" scale. Elimination of the phase-separation pattern is desirable relative to obtaining a more uniform cured polyurethane.

Referring to the formulations which contained 1,3-dimethyl urea, it should be noted that the cured polyurethane had a phase separation pattern. Although 1,3-dimethyl urea is polar and is expected to be insoluble in the reaction during cure, the dimethyl urea is rapidly melted (melting point 101°–4° C.) at the cure temperature utilized (140° C.) and is ineffectual as a nucleating agent.

The same observations of a phase-separation pattern were observed on the cured polyurethanes containing urea. Urea, although polar and expected to be insoluble in the curing reaction mixture, will be melted (133°–5° C. melting point) at the 140° C. cure temperature utilized in our experiments. The notation "gelled" on the polyurethane containing 0.5 wt. % urea was included to record why we did not try higher levels of urea. Urea functions as a powerful catalyst causing premature gelling.

TABLE I

Effect Of Nucleating Compounds On Appearance Of Cured Polyurethanes

| Prepolymer | Nucleating Compound Identification | wt. % | mpt. °C. | Appearance of Cured Polyurethane* |
|---|---|---|---|---|
| B | 1,3-dimethyl urea | 0.50 | 101–4 | phase separation pattern |
| B | 1,3-dimethyl urea | 1.00 | 101–4 | phase separation pattern |
| B | 1,3-dimethyl urea | 2.00 | 101–4 | phase separation pattern |
| B | urea | 0.10 | 133–5 | phase separation pattern |
| B | urea | 0.20 | 133–5 | phase separation pattern |
| B | urea | 0.50 | 133–5 | gelled |
| A | adipic acid | 1.00 | 151 | very faint phase separation pattern |
| A | adipic acid | 2.00 | 151 | very faint phase separation pattern |
| B | biuret | 0.50 | 188–9 | uniform translucent white |
| A | MDI/BDO Adducts | 1.00 | ca 180–200 | very faint phase separation pattern |
| C | MDI/BDO Adducts | 1.00 | ca 180–200 | very faint phase separation pattern |
| C | MDI/BDO Adducts | 2.50 | ca 180–200 | very faint phase separation pattern |
| A | MDI/BDO Adducts | 2.50 | ca 180–200 | very faint phase separation pattern |
| G | MDI/BDO Adducts | 2.50 | ca 180–200 | uniform translucent white |
| A | MDI/BDO Adducts | 5.00 | ca 180–200 | uniform translucent white |
| D | MDI/BDO Adducts | 5.00 | ca 180–200 | uniform translucent white |
| B | carbanilide | 0.50 | 234–6 | uniform translucent white |
| F | carbanilide | 2.50 | 234–6 | uniform translucent white |
| F | carbanilide | 5.00 | 234–6 | uniform translucent white |
| B | oxamide | 0.50 | 300 | some specs otherwise uniform translucent white |
| E | oxamide | 2.50 | 300 | some specs otherwise uniform translucent white |
| A | terephthalic acid | 0.50 | 300 | uniform translucent white |

*Control cured polyurethanes prepared with prepolymers A, B, C and D were translucent white with a distinct pattern of phase separation
Control cured polyurethanes prepared with prepolymers E, F and G were less translucent white and exhibited a less pronounced but still distinct phase separation pattern.

Discussion of Experimental Results

Referring to Table I, it is noted that all of the control cured polyurethanes containing the 400 molecular weight poly(oxyethylene)diol had distinct patterns of a Referring to the data on the cured polyurethanes containing adipic acid (melting point 151° C.), usually very faint phase separation patterns were observed. An interpretation of the results is that, although adipic acid melts above the cure temperature of 140° C., the actual temperature of the cure is somewhat above the recorded 140° C. temperature because of the highly exothermic reaction of the "free" NCO functions on the prepolymer and the "free" NCO functions on the excess MDI present with the chain extender 1,4-butanediol. Thus part of the adipic acid could have melted under the cure conditions employed and would have been ineffectual as a nucleating agent.

Biuret which has a melting point of 188°-9° C. appears to be an effective nucleating agent in that the cured polyurethane had no evidence of a phase-separation pattern.

While not being limited by theory, it is thought that even compounds such as 1,3-dimethyl urea would function as nucleating sites if the maximum temperature attained during curing (cure temperature plus temperature increase due to the reaction exotherm) were held below the melting point of 1,3-dimethyl urea.

The next section of nucleating compounds are referred to as MDI/BDO adducts. These adducts are relatively easily prepared via addition of BDO to a urethane prepolymer containing excess MDI and allowing the adducts to separate as a white solid. Since the molecular weight of the adducts may vary, a melting point range of 180° to 220° C. was recorded as an approximate melting point range. The adducts contain reactive NCO functions; therefore, the melting point range was estimated based on DSC (differential scanning calormetry) thermograms of cured polyurethanes containing these adducts.

It should be noted that at 1.00 to 2.50 wt. % concentrations of these MDI/BDO adducts, only very faint patterns of the hard segment phase separation were noted. It is expected that if the BDO were replaced by a more polar extender such as ethylene glycol, ethanol amine, 1,2-diaminoethane, 1,4-diaminobenzene and the like, the adducts would be less soluble; and, therefore, more effective as nucleating sites. At the higher 5.00 wt. % level of MDI/BDO adducts, the cured urethane specimens were a uniform translucent white with no evidence of a phase separation pattern. These observations indicate that the MDI/BDO adducts have some solubility in the curing reaction mixture and, thus, their effectiveness as nucleating sites will be a function of concentration of the adducts.

High melting, relatively insoluble carbanalide, oxamide and terephthalic acid were tested as nucleating agents for a more uniform phase separation of hard segments. As shown in Table I, all three of the compounds appear to prevent the undesired phase separation pattern in the cured polyurethanes.

A maximum level of effective nucleating compounds was observed. Since the effective nucleating compounds are insoluble in the curing reaction mixture, too large a concentration will result in "local excesses" of the nucleating agent leading to defects in the cured polyurethane. It should be obvious to skilled urethane technologists that the particle size of the nucleating agent should be relatively small and the nucleating agent well dispersed in the reaction medium.

The various urethane polymers made according to the present invention can generally be utilized as molded articles, conveyor belts, cast tires, and the like.

In accordance with the patent statutes, while preferred embodiments and best mode have been described in detail, the scope of the invention is not limited thereto, but rather by the scope of the attached claims.

What is claimed is:

1. An essentially phase free separation pattern urethane elastomer composition, comprising:
   a urethane prepolymer having free polyisocyanate therein;
   from about 0.01% to about 5.0% by weight based upon the weight of said prepolymer of a fine nucleating agent, said fine nucleating agent uniformly dispersed in said prepolymer whereby a nucleating agent-prepolymer blend is formed, a chain extender, said chain extender added to said formed nucleating agent-prepolymer blend, said nucleating agent prepolymer blend cured by said chain extender at a curing temperature so that the urethane composition is essentially free of phase separation patterns.

2. The urethane elastomer composition according to claim 1, wherein the amount of said free isocyanate is from about 1% to about 20% by weight based upon the weight of said prepolymer, wherein said free polyisocyanate has the formula $R(-N=C=O)_n$ where R is an aliphatic group having from 2 to 20 carbon atoms, a cycloaliphatic having from 4 to 20 carbon atoms, an aromatic or an aliphatic substituted aromatic having from 6 to 20 carbon atoms, and wherein n is 2 or 3.

3. The urethane elastomer composition according to claim 2, wherein said nucleating agent has a melting point higher than said curing temperature.

4. The urethane elastomer composition according to claim 3, wherein said nucleating agent is a polar organic compound insoluble in said urethane prepolymer and has an average particle size of less than 200 microns.

5. The urethane elastomer composition according to claim 4, wherein said chain extender is selected from the group consisting of diol, diamine, amino alcohol, and combinations thereof, and wherein said nucleating agent is selected from the group consisting of a urea having from 1 to 14 carbon atoms, dicarboxylic acids having from 2 to 12 carbon atoms, acid anhydrides having from 4 to 8 carbon atoms, amides having from 2 to 8 carbon atoms, imides having from 4 to 8 carbon atoms, and combinations thereof.

6. The urethane elastomer composition according to claim 5, wherein the amount of said free polyisocyanate is from about 4.0% to about 16.0% by weight and wherein "n" of said polyisocyanate is 2.

7. The urethane elastomer composition according to claim 6, wherein the melting point of said nucleating agent is at least 5° C. greater than said curing temperature, wherein the amount of said nucleating agent is from about 0.5% to about 3.0% by weight and wherein said nucleating agents are selected from the group consisting of adipic acid, biuret, carbanilide, oxamide, terephthalic acid, and combinations thereof.

8. The urethane elastomer composition according to claim 7, wherein the amount of said free polyisocyanate is from about 8.0% to about 13.0% by weight and wherein said chain extender is selected from the group consisting of ethylene glycol, propanediol, 2-methyl-1,3-propanediol, butanediol, amine analogs and said diols, ethanol amine, aminopropanol, phenylenediamines, aminophenol, and combinations thereof, and wherein said nucleating agent has an average particle size of less than 10 microns.

9. A process for producing urethane elastomers which are essentially free from phase separation patterns, comprising the steps of:

adding urethane prepolymers containing free polyisocyanate therein to a vessel;

adding from about 0.01% to about 5.0% by weight based upon the weight of said prepolymer of a nucleating agent;

mixing said prepolymer and said nucleating agent so that said nucleating agent is uniformly dispersed throughout said prepolymer, subsequently adding a chain extender to said nucleating agent-prepolymer mixture, and curing said nucleating agent-prepolymer mixture.

10. The process according to claim 9, wherein said amount of free polyisocyanate is from about 1.0% to about 20% by weight, wherein said polyisocyanate has the formula $R(N=C=O)_n$ where R is an aliphatic having from 2 to 20 carbon atoms, a cycloaliphatic having from 4 to 20 carbon atoms, an aromatic or an aliphatic substituted aromatic having from 6 to 20 carbon atoms.

11. The process according to claim 10, wherein said nucleating agent has an average particle size of less than 100 microns.

12. The process according to claim 11, wherein said curing agent has a melting point at least 5° higher than said curing temperature, and wherein said nucleating agent is selected from the group consisting of a urea having from 1 to 14 carbon atoms, dicarboxylic acids having from 2 to 12 carbon atoms, acid anhydrides having from 4 to 8 carbon atoms, amides having from 2 to 8 carbon atoms, imides having from 4 to 8 carbon atoms, and combinations thereof.

13. The process according to claim 12, wherein the amount of said free polyisocyanate is from about 4% to about 16% by weight and wherein said chain extenders are selected from the group consisting of diol, diamine, amino alcohol, and combinations thereof.

14. The process according to claim 13, wherein the amount of said nucleating agent is from about 0.5% to about 3.0% by weight, and wherein the amount of said free polyisocyanate is from about 8% to about 13% by weight.

15. The process according to claim 14, wherein said nucleating agent has an average particle size of less than 10 microns and is selected from the group consisting of adipic acid, biuret, carbanilide, oxamide, terephthalic acid, and combinations thereof.

16. A urethane elastomer comprising:

the reaction product of (A) a urethane prepolymer having free polyisocyanate therein and (B) at least one incremental amount of a curing agent with an insoluble product being produced thereby so that a urethane composition essentially free of phase lines is produced; said incremental amount being from about 0.01% to about 5% by weight based upon the total amount of said curing agent utilized in forming said urethane elastomer, and wherein the remaining amount of said (B) curing agent is subsequently added.

17. The urethane elastomer reaction product according to claim 16, wherein the amount of said free polyisocyanate is from about 1% to about 20% by weight based upon the total weight of said prepolymer, and wherein said free polyisocyanate has the formula $R(-N=C=O)_n$ where R is an aliphatic group having from 2 to 20 carbon atoms, a cycloaliphatic having from 4 to 20 carbon atoms, or an aromatic or an aliphatic substituted aromatic having from 6 to 20 carbon atoms.

18. The urethane elastomer reaction product according to claim 17, wherein the total amount of said curing agent is from about 0.8 to about 1.2 equivalents based upon the total number of isocyanate equivalents in said prepolymer.

19. The urethane elastomer reaction product according to claim 18, wherein said incremental addition of said curing agent with said prepolymer is at a temperature of from about 25° C. to about 200° C.

20. The urethane elastomer reaction product according to claim 19, wherein said curing agent is selected from the group consisting of diol, diamine, amino alcohol, and combinations thereof, and wherein said remaining amount of said curing agent is reacted with said prepolymer at a temperature of from about 110° C. to about 200° C.

21. The urethane elastomer reaction product according to claim 20, wherein the amount of said free polyisocyanate is from about 4% to about 16% by weight and wherein the amount of said initial incremental addition is from about 0.5% to about 4.0% by weight.

22. The urethane elastomer reaction product according to claim 19 wherein said curing agent is selected from the group consisting of polyols having from 2 to 12 carbon atoms, and amines having from 2 to 12 carbon atoms.

23. The urethane elastomer reaction product according to claim 22, wherein said curing agent is selected from the group consisting of ethylene glycol, propanediol, 2-methyl-1,3-propanediol, butanediol, amine analogs of said diols, ethanol amine, aminopropanol, phenylenediamines, aminophenol, and combinations thereof.

* * * * *